S. G. MILLER & D. O. DE WITT.
TRACTOR HARVESTER.
APPLICATION FILED JUNE 5, 1916.

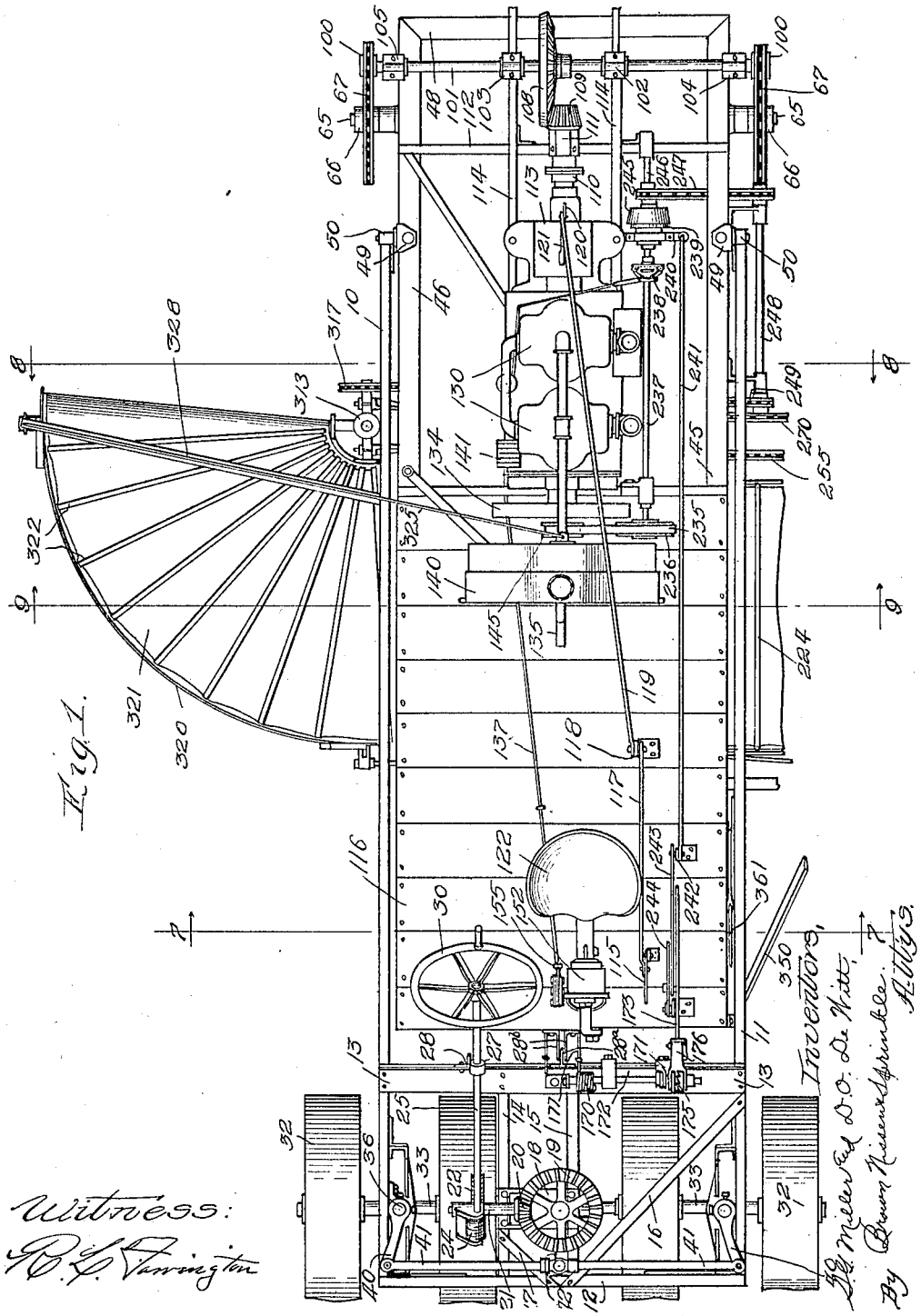

1,298,244.

Patented Mar. 25, 1919.
10 SHEETS—SHEET 2.

S. G. MILLER & D. O. DE WITT.
TRACTOR HARVESTER.
APPLICATION FILED JUNE 5, 1916.

1,298,244.

Patented Mar. 25, 1919.
10 SHEETS—SHEET 3.

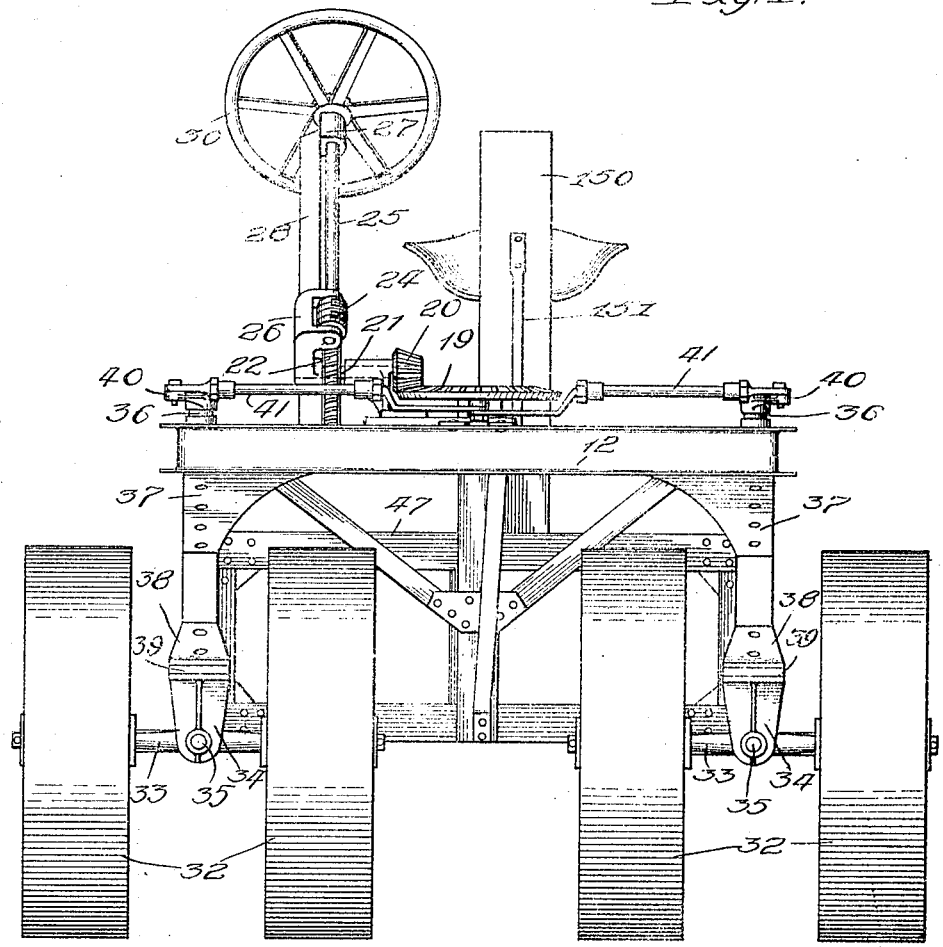

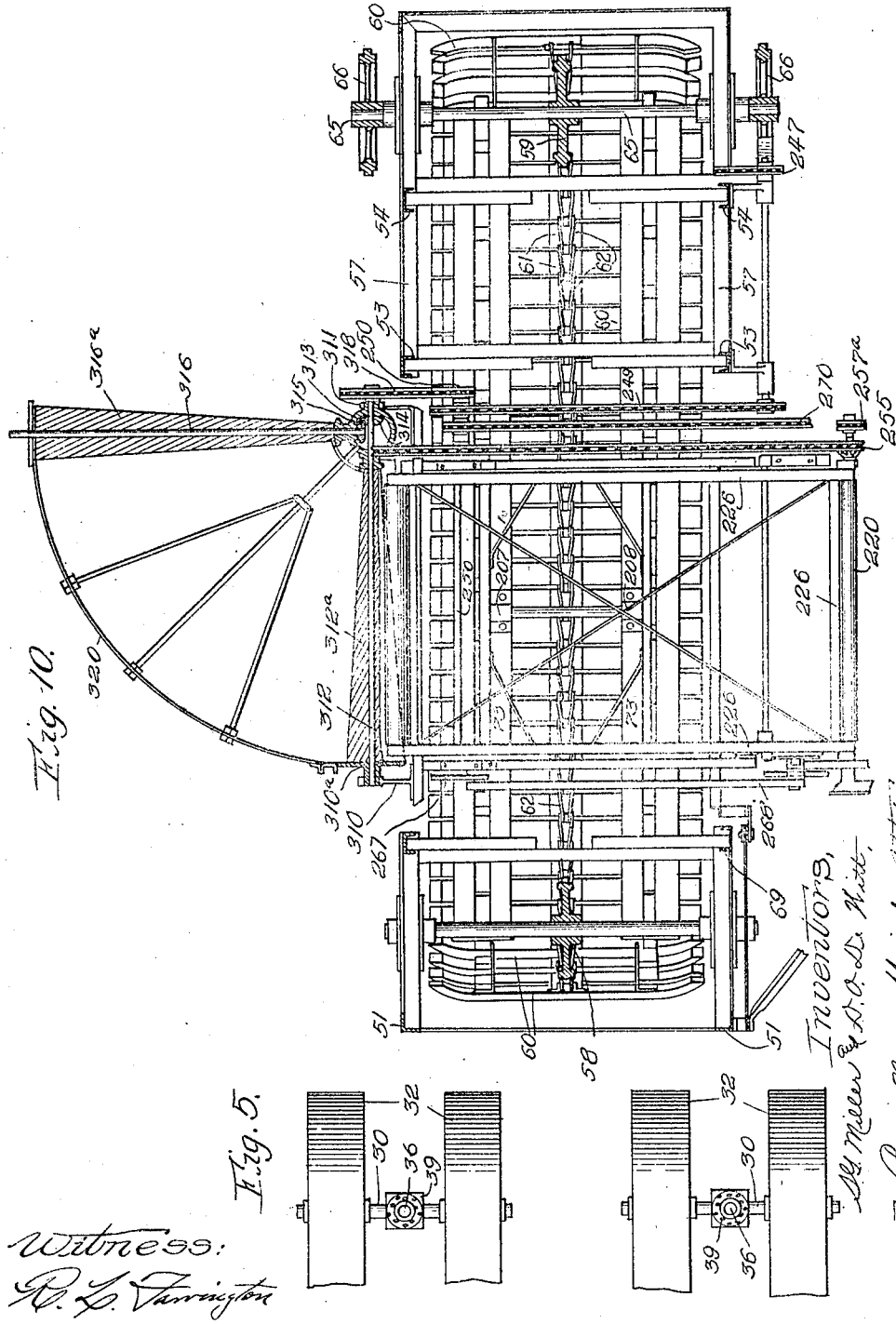

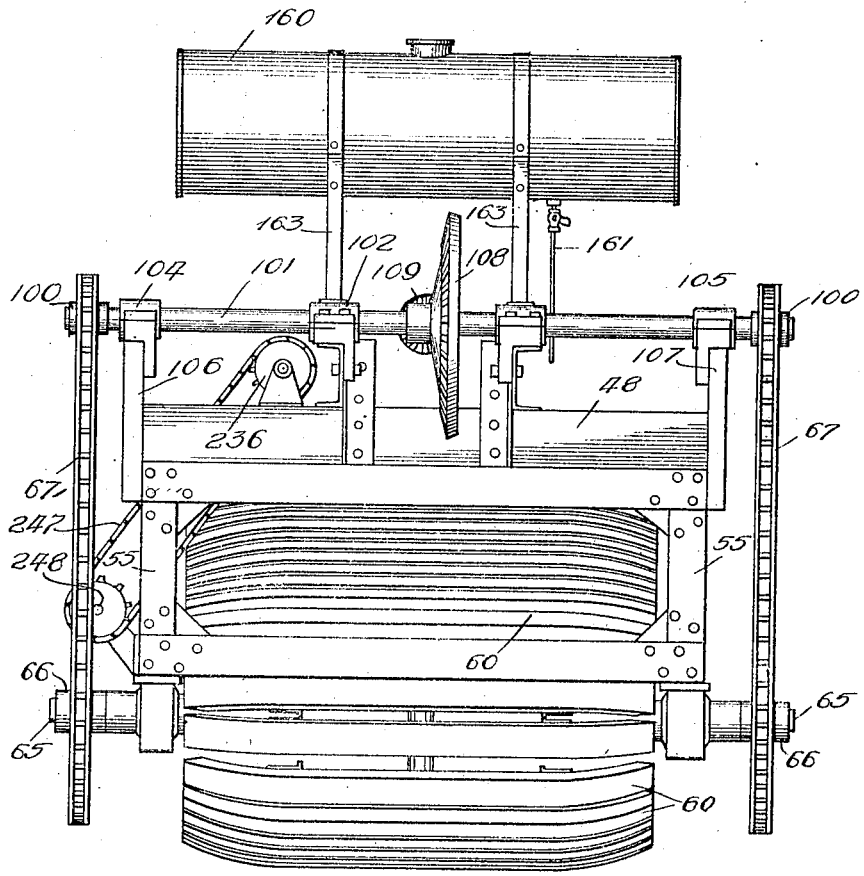

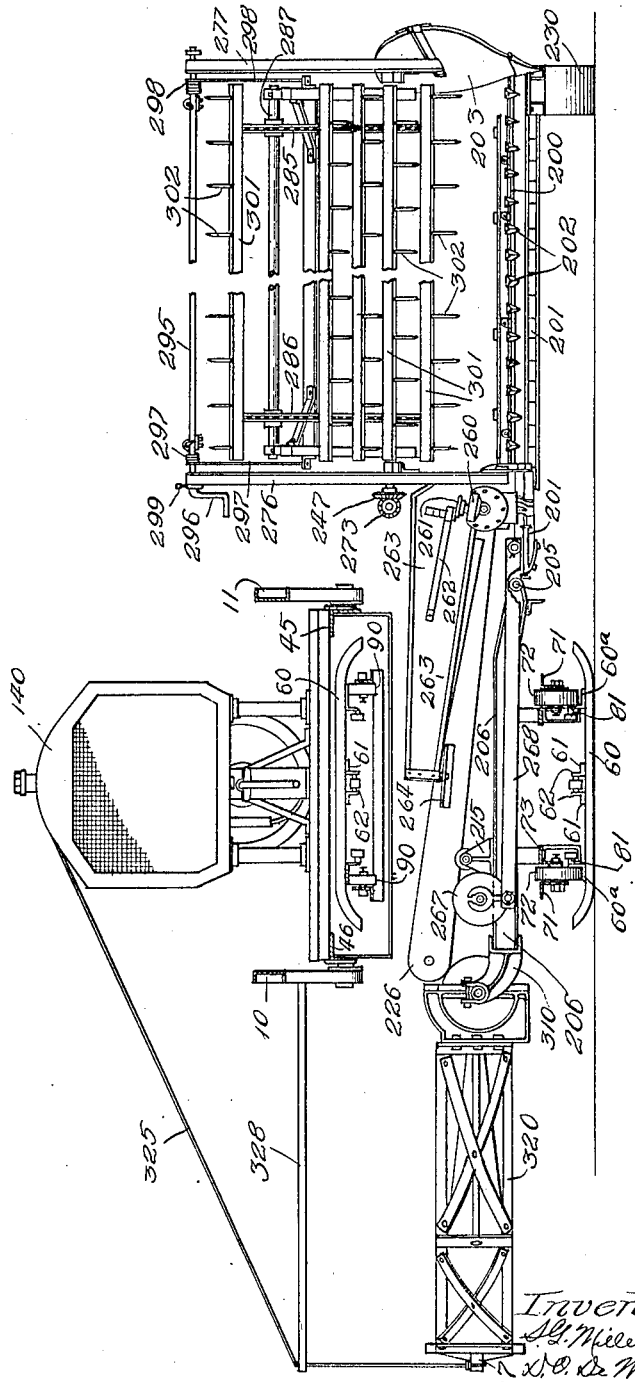

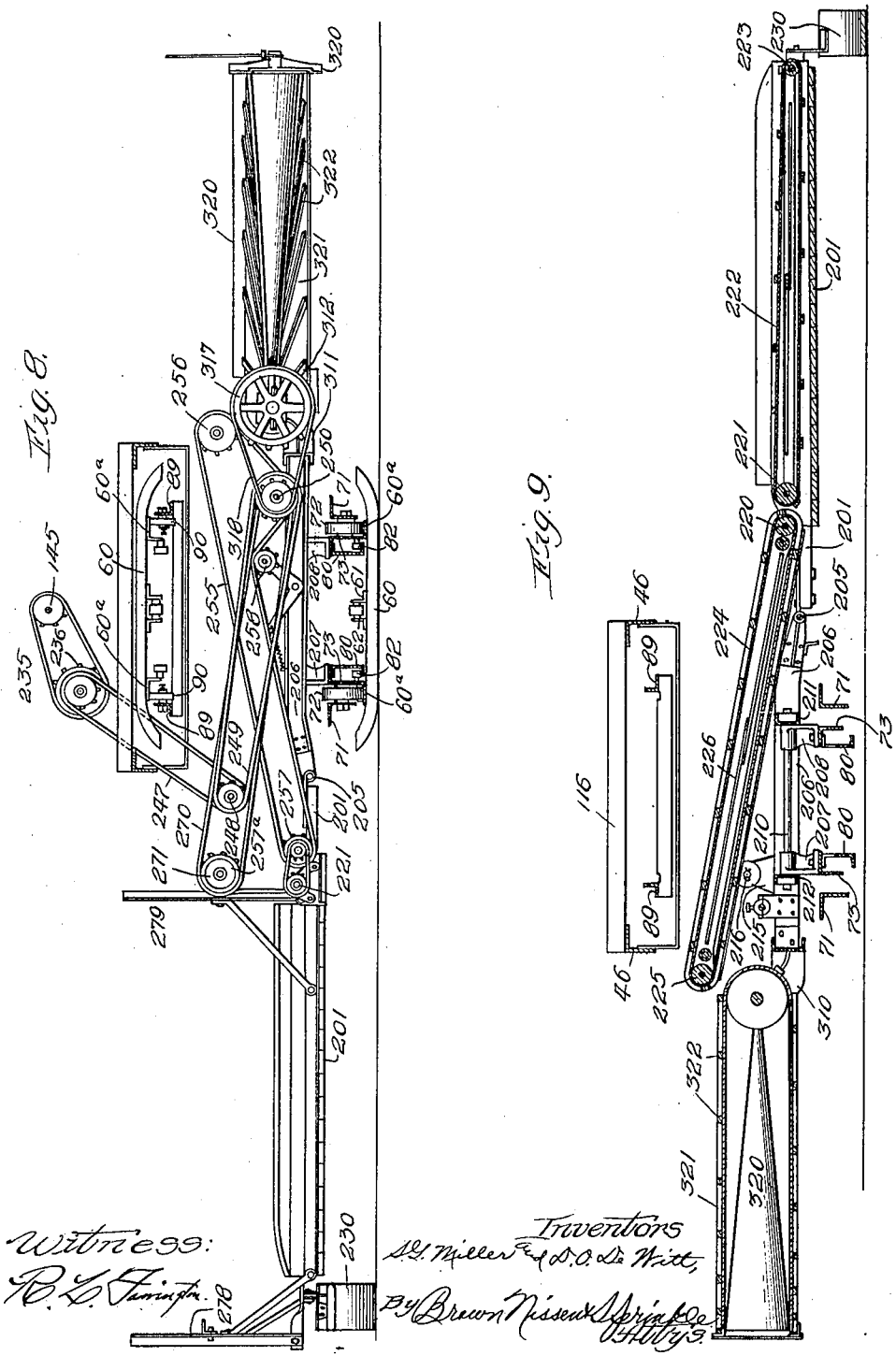

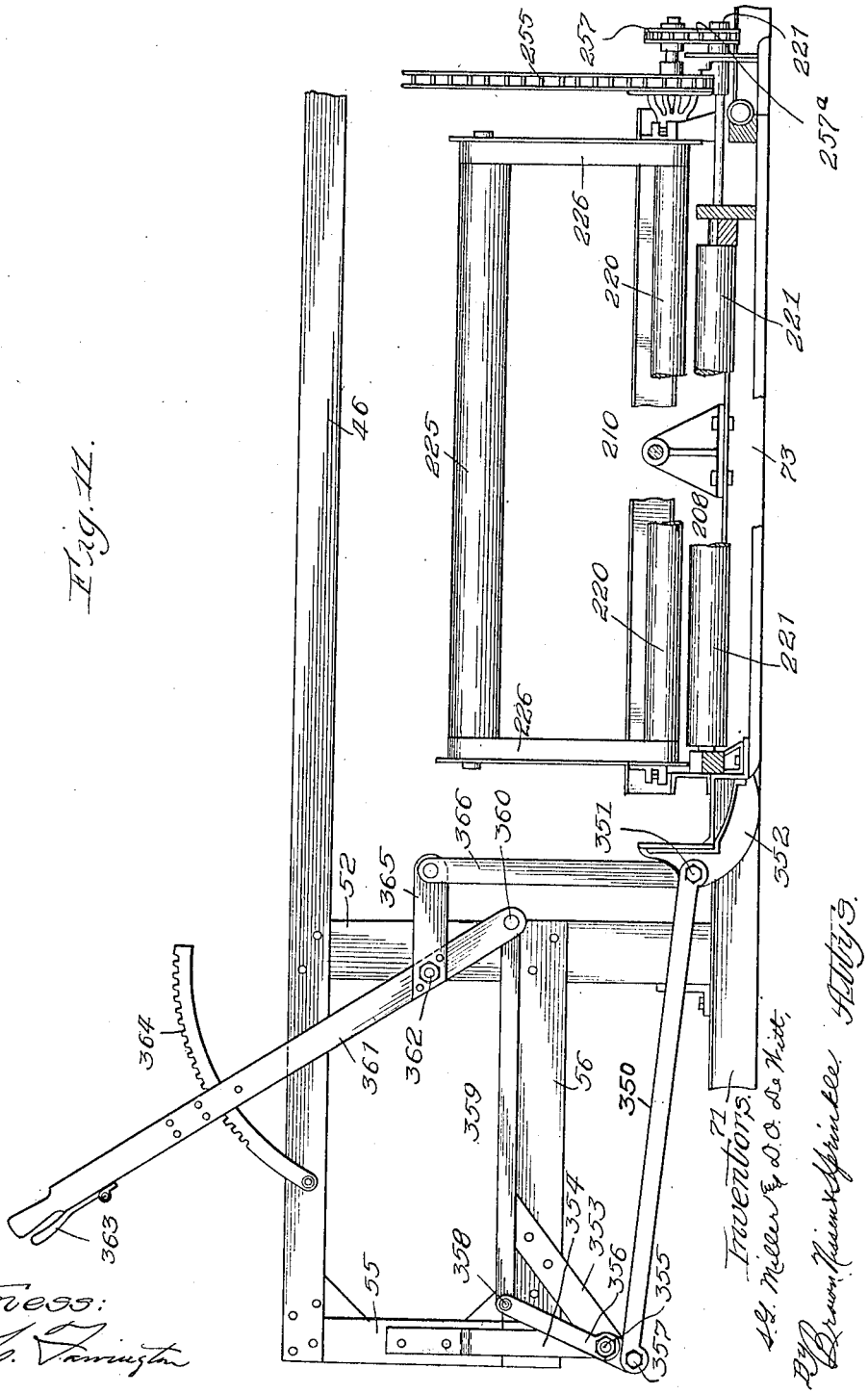

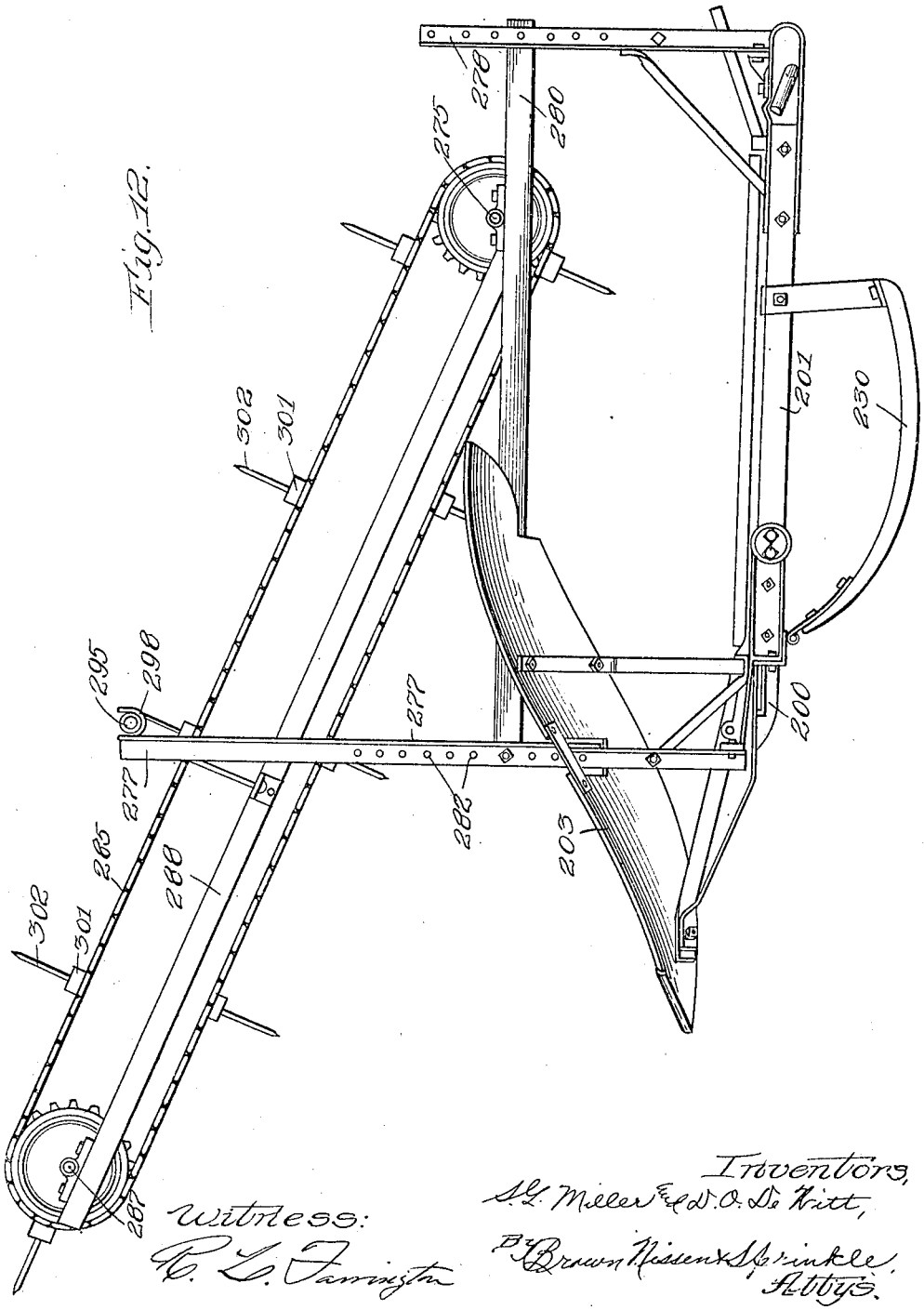

UNITED STATES PATENT OFFICE.

STANLEY G. MILLER AND DORCY OLEN DE WITT, OF ST. PAUL, MINNESOTA, ASSIGNORS TO THE GENERAL MACHINERY & INVESTMENT COMPANY, OF ST. PAUL, MINNESOTA, A CORPORATION OF MINNESOTA.

TRACTOR-HARVESTER.

1,298,244.     Specification of Letters Patent.     Patented Mar. 25, 1919.

Application filed June 5, 1916. Serial No. 101,660.

*To all whom it may concern:*

Be it known that we, STANLEY G. MILLER and DORCY O. DE WITT, both citizens of the United States, and both residing at St. Paul, in the county of Ramsey and State of Minnesota, have invented certain new and useful Improvements in Tractor-Harvesters, of which the following is a specification.

Our invention relates to that class of agricultural machines known as "tractor harvesters", and particularly to that class of machines in which the power of the engine or motor is directed not only to the operation of the several parts of the machine, but also to the driving of the machine over the ground.

The embodiment of the invention which we shall herein show and describe, is particularly adapted for harvesting grass or grain in fields in which the soil may be of an exceedingly soft or spongy nature, due to the fact that the ground is low and wet, or from other causes, and in the embodiment referred to, the grass or grain, after being cut, is carried laterally through or across the main frame of the tractor portion of the machine, there to be handled by a swathing or other suitable attachment.

It is the principal object, therefore, of our invention, to combine a traction device, preferably of the caterpillar type as herein shown and described, with harvester mechanism so that the whole may operate together efficiently over the most difficult conditions of wet or boggy fields, for the purpose of enabling the harvester mechanism to cut and deliver in a swath or in other desired manner, standing grass or grain.

The particular type of traction mechanism employed in the embodiment of the invention herein shown and described, is known as the "caterpillar" type of tractor, and it is one of the objects of the invention to combine grain or grass cutting and delivering mechanism so as to operate efficiently when propelled and sustained by traction mechanism of the described character. In the embodiment of the invention herein shown, the machine is particularly adapted for the cutting of slough grass largely used in the manufacture of grass matting, carpets, etc., and it is an object of the invention to combine the various harvester and tractor mechanisms hereinafter shown and described, in such a manner as to pass over the worst conditions of earth or soil where slough grass is to be found, and to cut the same and deliver it in a continuous swath for curing.

Other objects of the invention are set forth in the following specification descriptive of the drawings which show our preferred embodiment of the invention and which is finally set forth more particularly in the appended claims.

In the said drawings, Figure 1, when taken together with Fig. 2, constitutes a complete top plan view of our tractor harvester.

Fig. 3 is an elevation from the stubbleward side of the machine.

Fig. 4 is a front elevation of the main or steering frame.

Fig. 5 is a detail view showing the manner of connecting the steering wheels with the main or steering frame.

Fig. 6 is a rear elevation of the frame and the tractor and harvester mechanism carried thereby, the lateral extensions of the cutting mechanism and swathing devices being omitted.

Fig. 7 is a view showing the swathing and cutting devices in elevation but with the tractor and harvester frames partly in section and partly broken away, the view being taken upon the broken line 7—7 of Figs. 1 and 2.

Fig. 8 is a broken sectional view through the driving frame looking from the rear toward the front of the machine on the line 8—8 of Figs. 1 and 2.

Fig. 9 is a sectional view with parts broken away looking from the front of the machine toward the rear thereof on the line 9—9 of Figs. 1 and 2.

Fig. 10 is a sectional plan view taken through the driving mechanism of the swathing attachment and through the driving mechanism of the caterpillar tractor structure parts of the cutting mechanism and other portions being broken away for the sake of clearness in the drawing.

Fig. 11 is a detailed drawing with parts broken away and in section, of the compensating connecting devices for adjusting the harvester cutter bar relative to the tractor frame.

Fig. 12 is a side elevation of the cutter bar platform on the grainward or grassward end thereof, and shows the parts carried thereby including the reeling mechanism.

By referring to the top plan and side elevation views (Figs. 1 and 3) a comprehensive idea of the frame structure we prefer to employ in connection with the carrying out of our invention may be obtained.

What will be termed the main or steering frame will be first described. This frame is shown as comprising two suitably spaced side stringers indicated by the reference characters 10, 11. These may be of any suitable material and of any desired shape in cross section, although we preferably use iron or steel in the channel form, as shown, and across the front of this frame there is a connecting portion 12, preferably of the same material either formed integrally with the side bars 10, 11 or suitably connected thereto as illustrated. For the purpose of strengthening this frame, and to provide suitable means for supporting the steering column or steering wheel and its connections, and for operating the gear frame to be presently described, a connecting bar 13 is provided, the same extending laterally between side bars 10 and 11 and being tied to the front cross member 12 of the frame by the tie pieces 14, 15. The latter, in conjunction with the diagonal braces 16 and 17 brace the front end of the steering frame and afford a support for the pivotal mounting for the face gear 19. Rotation is imparted to the face gear 19 through a bevel pinion 20 carried by a short shaft journaled in bearing 21 and being provided with a worm gear 22 at its other extremity adjacent the worm bracket 26 (see Figs. 3 and 4). The shaft 25 comprises the steering column and is journaled at its lower extremity in the worm bracket 26 and carries the worm 24 in engagement with worm gear 22. The upper end of the shaft 25 is rotatably journaled in bearing 27 supported by the standard 28, which latter is attached to the cross bar 13 and extends downwardly below the steering frame members 10 and 11 as illustrated in Fig. 3, being braced by one or more diagonal brace members 29. The shaft 25 carries the steering wheel 30 at its upper extremity, the same being convenient of access from the driver's seat. The devices for carrying and guiding the forward end of the steering frame are shown in the form of two trucks each composed of a pair of relatively wide-rimmed wheels in order that they may have considerable power to sustain themselves and the weight carried thereby on soft or marshy ground. These trucks are shown in Figs. 1, 3, 4 and 5, and consist of the pair of wheels 32 mounted on the end of relatively short axles 33 and which latter are pivoted on axes parallel with the line of advance of the machine, the connection being made by means of the forks 34, the pivotal connections being indicated at 35. The pivotal connection 35 permits of a considerable amount of rocking movement of axles 33 and enables each truck to tilt its axle and accommodate the wheels to varying inequalities of surface over which the machine is operated, independently of its companion truck. Obviously the rocking or tilting movement of the axles 33 on pivots 35 will be independent of any controlling means from the driver's seat and such freedom of movement of the axles will not interfere with the steering of the machine. The forks 34, however, control the direction of the truck wheels and axles 32, 33 and this is accomplished by reason of the fact that the forks 34 have extending upwardly therefrom shafts 36 (Figs. 1, 4 and 5). Near the forward corner of the main or steering frame composed of members 10, 11, 12, are depending brackets or hangers 37 carrying suitable bearing members 38 at their lower extremities adapted to engage or coöperate with bearing surfaces on the upper extremities of the forks 34. Preferably antifriction bearings are inserted to lessen the friction, as indicated at 39 (Figs. 4 and 5). Crank arms 40 are rigidly secured to the upper extremities of the shafts 36 and connecting rods 41 extend from each of these crank arms to an arm or projection 42 on the face gear 19. By this construction it will be seen that any movement imparted to the steering wheel 30 will, through the mechanism described, be imparted synchronously to each of the two front steering trucks just described.

It will be seen that each of the channel side members 10, 11 of the main and steering frame, extend rearwardly just on the outside of an independently mounted gear frame which carries the motor and the driving mechanism as well as furnishes the support for the harvester cutting, transporting and swathing mechanism. The gear frame is of a very irregular construction, so far as its symmetry is concerned, but looking at a top plan view of same, as shown for example in Fig. 1, it is of a general rectangular form, consisting of the two side bars or channels 45, 46 which are preferably of such strength and construction that they may serve as the foundation for supporting the motor and driving mechanism as well as the harvester mechanism. This frame may be suitably braced to afford means for attachment of the various operating parts and is preferably connected at the front and rear with suitable channel members or cross bars 47, 48 the former being shown most clearly in Fig. 4 and the latter in Fig. 1. Large and substantial pivotal connections are provided between the rear extremities of the side members 10 and 11 of the main or steering frame and the main side bars 45, 46 of the gear frame (see Figs. 1, 3, and 7). A convenient construction for securing this pivotal connection is that illustrated in the drawings, consisting of the bracket castings 49. To the rear extremities of the frame members 10, 11, suitable sockets are secured, as indicated at 50, and pivot pins integral or rigid with brackets 49 enter these sockets to form a substantially hinged connection between the two frames. The construction described obviously permits a tilting movement of the gear frame on the axial line passing through the pivotal connections 50 in relation to the main or steering frame, while at the same time any steering or twisting movement of the steering frame will be imparted to the gear frame which latter, as it will presently be seen, contains and supports not only the tractive devices consisting of the caterpillar drive, but the motor for imparting movement to the entire machine as well. At its forward end the gear frame is guided in its tilting movements in relation to the steering frame by the spaced separated angles 28$^b$ (Fig. 1), which latter are curved to the arc described around the pivotal connections 50, and which coöperate with one flange of a T-beam or angle 28$^a$ secured to the steering frame. It will be seen that numerous branches of the gear frame depend from the side bars 45, 46 as indicated at 51, 52, 53, 54, and 55 (Fig. 3) at both sides of the gear frame, and connecting the lower extremities of the last mentioned depending members, are side bars 56 and 57 arranged in pairs on opposite sides of the frame, the former pair 56 of side bars supporting a relatively large toothed wheel 58 and the latter a similar wheel at the rear of the machine, shown in section in Fig. 10 and designated by the reference character 59, the gear 58 being also shown in section in this figure. The gears 58 and 59 are designed to carry the endless belt or caterpillar drive sometimes referred to in this art as an endless track and the machine itself as a caterpillar or track laying machine. This endless track is designated generally by the reference character 60 in the side elevational view Fig. 3, and elsewhere, and the details of construction thereof will be referred to later. It may be noted at this point in the description that in the preferred embodiment of the invention as herein illustrated, the interruption or space between the frame portions 56 and 57 is for the purpose of providing a clearance or opening between the upper and lower runs of the endless track or caterpillar traction device to accommodate the portion of the harvester corresponding to the ordinary elevator conveyer which conveys the cut material from the cutting mechanism to the swathing or other devices for taking care of the harvested product.

The harvester mechanism referred to will be more particularly described hereinafter, as we will first describe the general frame structure of our machine and the tractor mechanism which carries and operates the harvester mechanism or attachments. The construction of the endless track may be of the ordinary form of caterpillar track common in this general type of tractors, but we prefer the specific form shown herein, comprising a plurality of track bars of a substantially U-shape in cross section, hingedly connected together by substantial hinge plates, as indicated at 61 in Fig. 10. These hinge plates 61 may be riveted or bolted to the track bars or pallets 60 near their central portions, and are preferably provided with members as indicated at 62, Fig. 10, resembling the side bars or links of an ordinary sprocket chain, there being suitable pivot pins joining the links of each individual bar together, so that the track bars 60 are flexibly connected and will coact with the teeth on the main carrying sprocket wheels 58 and 59, the latter of which is the driving sprocket, since the cross shaft 65 on which it is mounted is provided at one extremity outside of the frame with a sprocket wheel 66 adapted to receive the link belt 67 from the source of power to be hereinafter more particularly described (see Figs. 1, 3, 6 and 10). It is preferred that the shaft 65 be extended through beyond the side members of the gear frame and that on each side thereof there shall be a driving gear 66 connected by a link belt 67 with a countershaft which is driven from the source of power on the gear frame (see Figs. 1, 6 and 10).

The track bars 60 already referred to as U-shape in cross section, will be seen to be hingedly connected together, so that their channeled portions are presented toward the peripheries of the driving sprockets 58 and 59, thus presenting a closed and smooth outer or peripheral surface to the ground over which the machine is to be driven. An important feature of the construction of the track bars 60 may be seen from an inspection of the same in Figs. 6, 7 and 10, and from which it will be observed that at each of the extremities of these members 60 the material is bent or curved so that when the track or a portion thereof lies flat upon the ground, the extremities will protrude at an angle upwardly and the extreme end portions will not ordinarily contact with the surfaces over which the machine is driven, unless the ground be so soft that the track will sink therein a considerable distance, as it is preferred that these outer extremities of the track bars or pallets be detracted upwardly several inches. This construction of the track bars or pallets is of great advantage in turning movements when certain parts of the track must move laterally and these track bars hence slide longitudinally, as the sled-runner-like ends thereof will not engage with the ground or rough portions thereof and so make the turning operation more difficult. Depending from the frame members 56 and 57 at each side thereof, are bracket arms, indicated by the reference characters 68, 69 and 70, there being one of each on each side of the frame, and these members at their lower extremities carry guide bars 71, there being two of these bars, one at each side of the endless track and each carrying a plurality of rollers 72 spaced apart on the bars 71 (see Figs. 3, 7, 8, 9 and 10). The guide bars 71 at each side of the track are each supplemented by similar bars running parallel with them and spaced apart from them only a short distance to allow the interposition between bars 71 and the last mentioned bars, designated by the reference character 73, of the aforementioned rollers 72. It will be seen that both bars 71 and 73 are formed of angle iron and are securely fastened to parts of the gear frame, so that the endless track members 60 which have short track portions 60$^a$ secured to them in position to coöperate with the track wheels 72, may furnish a support for these track bars and the wheels carried thereby, and in this manner the track will form a support for carrying the entire weight of the machine in a well known manner.

In caterpillar tractors or track laying machines of this type, it sometimes happens that the machine in passing over ditches extending laterally to the direction of advance of the machine, will permit portions of the endless track to drop downwardly or to sag downwardly between the supporting sprocket wheels coöperating with the track. To avoid this is one of the objects of the present invention, and we accomplish this by securing channel bars as indicated at 80 (Figs. 7, 8 and 9), to angle bars 73. Brackets or extensions 81 on the track plates 60$^a$ carry antifriction rollers 82 engaging the lower flanges of the channel bars 80 and furnishing a substantial guide against any downward deflection of the track bars or pallets under conditions as described. The angle bars 71 and 73 in addition to furnishing a means for supporting the antifriction guide rollers 60$^a$ and the guide channels 80 for the lower run of the endless track, serve another very important function, namely that of a frame forming a means of securement to the gear frame of the harvester cutting, elevating or transporting and delivering mechanism which is pivotally connected therewith in a manner which will be hereinafter described. The upper run of the endless track, consisting of the pivotally connected track members or pallets 60, is preferably deflected upwardly somewhat above the normal line of tangency between the supporting sprockets 58 and 59, as will be seen most clearly by reference to Fig. 3. This upward deflection of the upper run of the track is for the purpose of giving greater clearance between the two runs of the track, to enable the harvester elevating or carrying mechanism to be interpositioned therebetween and save any undue elevation of the material to be harvested by the machine, as that is obviously useless labor since in our machine it is desired to deliver the cut material on the opposite side of the endless track from the cutting mechanism and deposit it in a continuous windrow for drying upon the ground. Suitable guide bars for the upper run of the track are provided only between the vertical frame members 52—53 at each side of the gear frame, and the track is caused to pass over these guide members, being directed to and from the same by the idler rollers 87 and 88 (Fig. 3). Antifriction rollers spaced apart are provided on these upper guide members referred to, the guide members or bars being designated by the reference character 89 and the rollers by the reference character 90. Obviously the rollers 90 (Fig. 8), coöperate with the plates 60$^a$ on the endless track. It will be apparent that the function of the bars 89 and idlers 90 thereon, as well as the guide rollers 87, 88, is to deflect the upper run of the endless track and to prevent sagging of that portion of the track particularly over the harvester conveying mechanism.

The chains 67 coöperating with the sprockets 66 for driving the endless track, pass over sprockets 100 at the outer extremities of countershaft 101 which latter is rotatably mounted in suitable bearings 102, 103 on the rear extremity of an upper frame which is mounted on the top of the upper sills 46 of the gear frame. The outer extremities of the countershaft 101 are supported by bearings 104, 105 carried on the ends of uprights 106, 107 projecting above the top of the gear frame. The reference character 108 indicates a face gear secured to shaft 101 in mesh with a bevel pinion 109, the latter being secured to a longitudinal drive shaft (see Figs. 1, 3 and 6). This drive shaft is comparatively short and is indicated in the drawings by the reference character 110, being supported near the bevel pinion 109 by a bearing 111 mounted upon cross bar 112 which is a part of the engine supporting super-structure of the gear frame. By referring to Fig. 1 it will be seen that the engine sills 114 referred to support a transmission casing 113 in which is mounted any suitable form of gearing, not herein specifically shown or claimed as the same is common in engine drive mechanisms, for imparting the direction of rotation of the motor crank shaft to shaft 110 or the reverse rotation of said shaft at the will of the operator. In our harvester device we have shown only diagrammatically a gear shift lever (see Figs. 1 and 3) as indicated by the reference character 115. This lever is pivotally mounted on the gear frame platform which is a flat floor-like structure between the motor and the driver's seat, such as indicated by the reference character 116, Fig. 1. The reference character 117 indicates a link connected with a rocker arm 118, and the latter communicates by means of the link 119 with the vertical rocker arm 120, the latter having a link connection 121 with a transmission casing 113. Within the casing 113 we prefer to use common reversing gears as stated, so that the driver from his seat, indicated by the reference character 122, may shift the transmission gears in the casing 113 so that the longitudinal driving shaft 110 may be rotated in the same direction as the crank shaft of the motor or in the reverse direction, or the transmission gears may be shifted to a neutral position, allowing the motor to rotate without any connection with the shaft 110 by manipulation of the lever 115.

In so far as the invention is concerned, the specific construction of the motor is immaterial, but we have shown a motor of the vertical multiple cylinder type mounted upon the engine frame, the same being generally indicated by the reference character 130, 131 designating the intake manifold and 132 the carbureter. The reference character 133 designates the crank case of the motor which is adapted to be secured to the engine frame 114; 134 is the fly wheel on the engine crank shaft and 135 is a starter crank of usual or any desired construction for cranking the motor, the same being located in an accessible position to the driver from the gear frame platform 116 adjacent the driver's seat. Other details of the motor shown in the drawings which are incidental to the use of a motor of the type herein shown, are the water cooling devices or radiator, as indicated by the reference character 140 and the ignition device or magneto 141. The reference character 142 designates a fan driven by a suitable flexible driving belt from the pulley 143 on the engine crank shaft. The engine crank shaft adjacent the fly wheel 134 also has secured to it a driving sprocket 145 used for driving the harvester mechanism from the motor, which latter will be presently described. Just in front of the driver's seat 122 and adjacent the steering wheel 30 convenient of access to the driver, is a comparatively narrow cowl-board or dash 150 secured to the front of the gear frame and movable therewith. This is suitably secured to the gear frame by the brace 151 (see Fig. 4), and on this cowl or dashboard 150 are located the electrical devices, as indicated at 152, (see Fig. 3) for controlling the ignition of the motor. The gas or throttle control for the motor consists of the usual connections between the carbureter 132, only partially herein shown as the same forms no part of the present invention. The numeral 155 designates the gas or throttle lever pivotally mounted on the dash or cowl-board 150 adjacent the ignition coil, being of the form of a pivoted lever suitably connected, as by the vertical and horizontal links 156 and 157, with the carbureter. The fuel supply may be contained in a suitable tank as indicated at 160, as shown in Figs. 3 and 6. The usual connections between the fuel supply and the carbureter of the motor are partially shown by the broken portion of lead line or feed pipe 161 (Fig. 6). We show the gas tank 160 supported in a position above the superstructure of the gear frame on the metallic brackets or standards 162, 163 for the purpose of affording a gravity feed of fuel supply to the motor.

Reference has been made to the fact that the gear frame carrying the endless tractor belt and the motor is pivotally connected to the rear extensions of the main or steering frame members 10, in order to determine the direction of movement to be imparted to the machine through the steering wheels and their controlling mechanism.

To control the forward end of the gear frame in relation to the main and steering frame, we provide a flexible connection (see Figs. 1 and 3) consisting of a capstan 170 mounted in suitable bearings on the cross bar 13 of the main or steering frame, the bearings being indicated by the reference character 171. The numeral 172 designates the shaft controlling the capstan, and 173 is a lever within convenient reach of the driver, by which rotation may be imparted to the shaft 172 and the capstan 170 thereon. Any convenient construction may be employed for this purpose, but that which is preferred and shown comprises a ratchet wheel secured to shaft 172, as indicated by reference character 175. The numeral 176 indicates a casing having depending spaced branches journaled around shaft 172 on each side of ratchet wheel 175, so that the casing 176 is free to rotate in relation to the shaft 172 and the ratchet wheel 175, unless the two are locked together by means of pawl mechanism on the lower extremity of the handle 173 which is slidably mounted in the casing 176. The ratchet wheel 175 is provided with teeth on its outer periphery both laterally and radially. Engaging the ratchet teeth radially is a suitable pawl not shown on the drawings. The lower extremity of the sliding handle 173 is provided with means adapted to engage the lateral ratchet teeth of the ratchet wheel 175. One end of a wire rope 177 is secured to the capstan 170 and the other extremity of this rope is attached to the forward end of the gear frame as indicated at 178 in Fig. 3. By manipulating the hand lever 173 it will be seen that the driver may wind the wire rope 177 around the capstan and elevate the forward end of the gear frame in relation to the main or steering frame. This operation may be continued until the forward end of the endless track 60 is above the level of the steering wheels and consequently off the surface over which the machine is being driven. This is a very desirable feature in a tractor of this type as it enables the machine to be turned with comparative ease when the forward end of the gear frame and the endless track carried thereby is lifted clear of the surface except near the rearmost portion thereof.

Such portions of our machine as have thus far been described, refer to the tractor mechanism *per se*, and from the foregoing it will be seen that our tractor device comprises mechanism which is controllable from the driver's seat through the various instrumentalities already shown and described, by which the machine may be propelled over the ground in either the forward or the reverse direction by the shifting of the reversing gear lever 115 to the desired position whereby the motor will be connected with the power transmission devices as desired. Also that the gear shift lever 115 should be so related to the power transmission devices that the motor crank shaft may be disconnected from the machine to allow the motor to idle as in starting.

Harvester devices.

Reference has already been made to the peculiar construction of the gear frame to adapt it to accommodate the harvester mechanism. The manner in which the harvester mechanism is attached to the gear frame is shown most clearly in Figs. 3, 7, 8, 9, 10 and 11. The harvester portion of our machine, consisting of the usual cutter bar mechanism indicated by the reference character 200, has the usual rearwardly projecting platform 201, guard fingers 202 and outside divider 203. The platform frame 201 is hingedly connected at 205 (see Fig. 9) with the floating frame 206, the latter being hingedly connected with brackets 207, 208 which are bolted to the longitudinally extending angle irons 73 before referred to, on the gear frame between the upper and lower runs of the endless track. A good view of the construction of the supporting brackets 207, 208 on the gear frame at right angles to the view shown in Figs. 8 and 9, may be seen in Fig. 11, in which portions of the elevator or transporting mechanism of the harvester are broken away to disclose these details of construction. The reference numeral 210 is a pivot rod or hinge pin passing through bearings in the upper extremities of the brackets 207, 208 and hingedly connecting them with portions 211, 212 of the harvester main frame 206. This construction permits the tilting of the harvester main frame and the cutter platform on an axis parallel with the cutter bar, and at right angles to the line of advance of the machine. Supported by the harvester or elevator main frame 206 is a bracket 215 (see Figs. 7 and 9). There may be more than one of these brackets 215 provided and at the upper extremity an antifriction roller is carried, the same being designed to contact with the under side of a suitable part of the frame supporting the elevator canvas which receives the cut material from the harvester cutter platform and transports it through between the upper and lower runs of the endless caterpillar track, depositing the same upon apparatus to be presently described, for swathing, or depositing the material upon the ground. The inclination of the elevator canvas between the cutter platform and the swathing device is so slight that only one run of canvas is required and the elevator frame consequently consists of the canvas roller 220 journaled in the platform frame 201 on the grassward side of the hinge connection 205 and adjacent the delivery roller 221 carrying the platform canvas 222, so that whatever grass or grain is cut by the cutting apparatus and falls upon the platform canvas 222, which is supported at its outer extremity by the idle roller 223, will be conveyed in the usual manner to the elevator canvas where it passes over the roller 220 and is deposited thereon, the elevator canvas being indicated in the drawings by the reference character 224. Sprocket chain 257ª operates the platform canvas from the lower elevator roller. At its upper or stubbleward extremity, the elevator canvas is passed over the roller 225. The elevator rollers 220 and 225 are connected by suitable side bars, as indicated at 226 (Fig. 7) which engage the supporting rollers 216 before referred to, but resting upon the top thereof in such a manner that any variations in the position of the shoe 230 supporting the outer extremity of the cutter bar platform will cause the elevator frame to shift by sliding longitudinally over the idle supporting rollers 216 as the roller 220 moves radially around the platform hinge 205. Reference has been made to the shoe 230 which is of a sled-runner form supporting the outer end of the cutter bar platform in lieu of the usual harvester grain wheel. This construction is preferably employed because it is found in practice that in passing over wet and boggy ground the shoe 230 supports the platform more efficiently than the ordinary grain wheel, although obviously a very wide tread grain wheel may be employed instead.

At this point in the description of our harvester mechanism, it seems desirable to refer to the manner in which the same is operated. Reference has already been made to the sprocket wheel 145 on the engine shaft adjacent the fly wheel 134 (see Figs. 1 and 3). The reference numeral 235 designates a flexible driving chain preferably of the silent type, the same passing over sprocket wheel 236 on countershaft 237 at one side of the motor. In the form of motor shown, the shaft 237 is made to carry centrifugal governor mechanism as indicated at 238, for controlling the engine fuel supply and regulating the engine speed. The shaft 237 terminates in one member 239 of a two-part clutch, the latter being the sliding member of the clutch operated by the pivoted lever 240 and link 241, the latter being pivotally connected to an upright swinging arm at 242, pivoted on the gear frame platform adjacent the driver's seat. A link 243 extends from the swinging upright 242 to hand lever 244 located adjacent the driver's seat, whereby he may shift the movable clutch member 239 to engage or disengage a coöperating clutch member 245 which latter is carried upon a short shaft 246 as a continuation of shaft 237, and being rotatably journaled in the frame supporting the motor casing. A sprocket chain 247 extending at right angles from the shaft 246 communicates motion therefrom to devices for imparting motion to the harvester mechanism, so that the driver from his seat, by operating the hand lever 244 at will, may throw the harvester cutting, elevating and delivering mechanism into motion or may cause it to remain inactive as when it is desired to transport the machine over the roads or from field to field. The reference character 248 is a shaft rotatably journaled in suitable supporting brackets on the gear frame and extending parallel with the countershafts 237 and 246, and the before mentioned sprocket chain 247 passes over a driving sprocket thereon. A sprocket chain 249 (see Fig. 10) extends from the forward extremity of shaft 248 laterally across the gear frame between the upper and lower plies of the endless track and coöperates with a sprocket wheel on a countershaft 250 (see Fig. 8). The countershaft 250 is journaled in suitable supporting means on the floating harvester and elevator frame and it will be seen that the shaft 248 is not very far removed from the pivotal connection of the elevator frame 226 with the harvester platform, and also not far removed from the hinge connection 205 between the harvester platform and its supporting frame on the tractor gear frame. Therefore the harvester elevator and main frame may have movement due to the raising and lowering of the cutting apparatus without materially lengthening or shortening the distance between the driving shaft 248 on the gear frame and the countershaft 250. It is desirable also that the harvester elevator frame and cutting apparatus shall have a tilting movement on the pivotal connecting shaft 210, but this movement is necessarily of a limited character, due to the fact that only a few degrees of pivotal movement are required to raise and lower the cutting apparatus as much as desired for various kinds of cutting or for cutting different lengths of stubble, as such adjustments are ordinarily provided in machines of this character. The means for controlling the tilting movements of the harvester cutter bar and main frame mechanism on the pivotal shaft 210 will be presently described. On the counter shaft 250 there are three driving sprocket wheels for imparting movement to the swathing mechanism, the harvester reeling mechanism and lastly the harvesting and cutting mechanism.

The driving device for the harvester and cutting mechanism will first be described. This comprises a relatively long sprocket chain 255 which is looped around a sprocket wheel 256 (see Fig. 8) on the shaft of roller 225 at the upper extremity of elevator frame 226. The sprocket chain 255 at the upper ply thereof passes thence practically parallel with the upper ply of the elevator canvas to the lower end of the elevator frame 226 and is there looped around a sprocket 257 on one end of the roller supporting the lower end of the elevator canvas, and the chain passes thence over a spring pressed idler 258 and beneath the driving sprocket on the positively operated shaft 250, whereby rotation is imparted to both the upper and lower elevator rollers. The lower elevator roller has an extension on the front side of the elevator communicating with suitable beveled gears in a casing 260 (see Fig. 7) for driving a short vertical shaft on the top of which is a crank wheel 261 carrying a crank pin and a bracket 262 in engagement therewith for operating a reciprocating or oscillating butter board 263. The end of the butter board 263 is supported by the bracket 262, while the other end of the board has a sliding connection with the elevator frame, as indicated at 264. The countershaft 250 carrying the three driving sprockets referred to, is extended from the rear to the forward side of the harvester frame 206 and carries a crank wheel 267 at its forward extremity for driving the cutter pitman 268 (see Fig. 7). The pitman 268 drives the usual cutting mechanism reciprocating through slotted guard fingers 202 already referred to on the cutter bar. Another sprocket wheel on the pitman countershaft 250 drives the sprocket chain 270 which is passed around sprocket wheel 271 on the rear extremity of a comparatively short countershaft 272 carried in suitable bearings at the rear inside corner of the harvester platform adjacent its hinged connection with the harvester main frame, but situated in a plane somewhat above the latter connection (see Fig. 2). At the forward end of countershaft 272, is a bevel gear 273 meshing with a coöperating gear 274 on a shaft 275 which extends parallel with the cutter bar and is journaled in a frame comprising four uprights located adjacent the four corners of the harvester platform, the front uprights being indicated by the reference characters 276, 277 (see Fig. 7), the outside rear upright being indicated by the reference character 278 and the inside upright at 279 (see Figs. 8 and 12). These uprights 276 to 279 inclusive, constitute supporting means for the reel mechanism and the drive shaft 275 therefor, and the latter is journaled in two parallel bars 280, 281 (see Figs. 2 and 12).

The uprights 276 to 279 are provided with a plurality of spaced apertures as indicated at 282, Fig. 12, so that the side members 280, 281 supporting the reel mechanism may be adjustable with respect to height in relation to the cutter bar and cutter bar platform. The countershaft 272 and the before referred to shaft 275 for driving the reel, is carried on bearings attached to the reel frame member 281 and adjustable therewith, and the length of the rear driving chain 270 permits of adjustment of the shaft 272 vertically without destroying the operative relation of this shaft to the sprocket chain 270 and its operating sprocket wheel on the pitman countershaft 250.

Reel mechanism.

The reel mechanism that we prefer to employ (see Figs. 2, 7 and 12) comprises an endless belt made up of sprocket chains 285, 286 passing over suitable sprocket wheels on the shaft 275 and around sprocket wheels on a parallel shaft 287 which is journaled in a movable reel frame made up of parallel side members 288, 289 connected together by suitable diagonal braces, as indicated at 290, 291. Transverse braces, as indicated at 292, 293, may also be provided to strengthen the reel supporting frame, and the rearmost extremities of the side bars 288, 289 are pivotally secured to the reel driving shaft 275 adjacent its bearings on the supporting side bars 280, 281. The reel frame is adjustably supported at its forward extremity by means of a crank shaft 295 which is journaled in suitable bearings at the upper extremities of the forward reel supporting standards 276, 277 (see Figs. 2 and 7). The shaft 295 is operated by a suitable crank 296 adjacent the driver's seat or accessible to the operator from the platform on the tractor gear frame, and the reel supporting frame carrying the movable reel bars, may be raised and lowered on the pivotal shaft 275 by means of cables 297, 298 wound around the shaft 295 in capstan fashion. Any suitable means may be employed for securing the shaft 295 in its adjusted position, but we prefer a simple expedient such as the insertion of a removable pin indicated by the reference character 299 (Figs. 2 and 7) through corresponding openings in the bearing bush for the shaft 295 and the shaft itself adjacent the crank 296. The endless reel chains 285, 286, are provided with a plurality of spaced bars 301 carrying teeth 302. Since our machine is adapted particularly for the cutting and swathing of marsh grass, we show this type of reeling mechanism as we find it superior to any other form known to us in combing out and laying tangled grasses of this character upon the harvester platform canvas. The adjustment provided consisting of the shiftable reel supporting frame and the reel itself, which is adjustable by means of the cable and windless construction shown, may be positioned at any desired angle above the cutting apparatus, to meet the varying conditions of material to be harvested.

With the construction of harvester reeling, cutting and elevating mechanism described, it will be seen that the harvested material will be delivered at the upper end of the elevator canvas 224, and as it passes over the roller 225 on the opposite side of the endless traction devices from which it was cut, at this point it may be delivered either to the conventional binding or tying mechanism or to suitable swathing devices.

Since our machine is particularly adapted to harvesting of grasses, we omit any showing of binding or tying mechanism, and show only a swathing device which is mounted in a suitable framework pivotally connected to the harvester main frame where it extends through the endless tractor belt on the side opposite the cutting mechanism. The harvester main frame 206 is provided with brackets at its stubbleward extremity for the pivotal attachment of the frame of the swathing attachment. This means consists of two substantial brackets indicated by the reference characters 310 and 311, the former indicating the bracket at the forward end of the frame and the latter the bracket at the rear (see Figs. 7, 8, 9 and 10). The brackets 310 and 311 extend only a short distance beyond the harvester main frame 206 and contain suitable bearings in which is journaled a substantial shaft 312. The shaft 312 extends rearwardly through a casing 313 secured to the swathing attachment frame, where it is provided with beveled gear 314 engaging a coöperating gear 315 on a shaft 316 at right angles to the shaft 312. The latter shaft projects outside of the casing 313 at the rear and is provided with a sprocket wheel 317 which receives its movement through a sprocket chain 318 passing over the third of the driving sprockets heretofore referred to on the pitman countershaft 250 (see Figs. 8 and 10). The shafts 312 and 316 are supported by a suitable metallic frame in the form of a quadrant, as indicated by the reference character 320 (see Figs. 7 and 10). Each of the shafts 312 and 316 is provided with conical-shaped rollers 312$^a$ and 316$^a$ respectively, over which an endless belt, as indicated by the reference character 321 (Fig. 8) is passed.

The various details of the construction of this swathing mechanism have been set forth and the same claimed in our pending application Ser. No. 793,985, filed Oct. 8, 1913, and a further detailed description of the swathing device will not be given here, but it will be sufficient to say that as the material is delivered in a continuous swath from the elevator canvas 270 of the harvester main frame, the swathing canvas 321 provided with the radial slats or ribs 322 (see Fig. 8) will receive the cut material and instead of delivering it with the butts forward and the straw parallel with the line of forward advance of the machine, as would be the case if the swathing attachment were not present, the mechanism described will turn the cut material at right angles to the condition in which it is delivered to it and will discharge it upon the ground as it falls over the conical roller 316 at the rear of the swathing device in a continuous swath, with the heads toward the machine and the cut ends outwardly, the straw or strands of cut grass being at right angles to the line of forward advance of the machine.

The swathing device is preferably supported at its hinged connection with the harvester main frame by means of a flexible cord or rope, as the wire rope shown in Figs. 1, 3 and 7, and indicated by the reference character 325, one end of this rope being attached to a suitable part of the motor frame as indicated at 326 (Fig. 3) and the other end secured to the stud 327 at the outer extremity of the swathing machine frame. It is preferred that the flexible member 325 be deflected outwardly by a suitable brace, as indicated at 328 (see Figs. 1, 3 and 7).

From the above description, it will be apparent the manner in which the harvester mechanism operates, but one of the novel features of our machine resides in the manner in which the harvester frame proper is controlled in relation to the tractor gear frame. It will be obvious that to accommodate the harvester mechanism to various conditions of the ground and grain or grass, the harvester tilting mechanism for controlling the angle of the platform and cutter bar, must permit of a wide range of variation or adjustment so that the outside divider 203 and the inside divider 340 (see Fig. 2) may have a considerable range of adjustment in relation to the surface over which the machine is operating. It will also be apparent that with harvester mechanism of the described character, particularly where the cutter bar is of considerable length, the backward pull or strain on the cutter bar will be considerable, and it is desirable to anchor the harvester mechanism, including the cutter bar, to the tractor gear frame at a point adjacent the inside shoe in order to relieve the main frame pivotal connection 210, with the tractor gear frame, of at least a part of the strain which will be imposed upon this pivotal connection in moving the machine over various conditions of ground.

*Compensating drawbar connection.*

We accordingly provide our machine with a compensating drawbar connection which is one of the important features of our invention. Reference may be had to the detailed drawing in Fig. 11 to show this construction, and it will be seen that a draft bar or draw bar 350 is pivotally connected with the cutter bar and cutter bar platform to draw the harvester frame forward from the tractor gear frame, and this drawbar is pivotally connected with the inside shoe at 351 the shoe itself being designated by the reference character 352. It will be apparent that since the axis of rotation of the harvester main frame 206 and the hingedly connected cutter bar platform frame 201 is determined by the pivot rod 210 by which it is connected to the tractor gear frame, any tilting of the cutter bar and its platform would tend to vary the distance between the inside shoe 352 and a relative point on the tractor gear frame to which the draw bar 350 could be attached— in other words, if the point of forward connection of the draw bar 350 be fixed to the tractor gear frame, then it would be impossible to tilt the harvester frame and the cutter platform. To overcome this difficulty we provide what we call our improved compensating draw bar connection between the inside shoe of the harvester and the tractor gear frame, as follows: Depending below the member 56 of the tractor gear frame is a rigid bracket made up of the two connected branches 353, 354 which intersect and are secured together and have a pivot pin or bolt 355 passing through them. These serve as a rigid support for a lever arm 356 pivoted thereon and having the forward extremity of the draw bar 350 pivotally connected at 357 to the short weight arm thereof. The member 356 is extended on the other side of the pivotal connection 355 so as to form a relatively long power arm in comparison with the weight arm and has connected to it at 358 a link 359 which has pivotal connection at 360 with the lower extremity of a hand lever 361, the latter being pivotally connected at 362 with the depending branch 52 of the gear frame. The lever arm 361 is provided with a hand latch at its upper extremity as indicated at 363, and this latch operates a pawl slidably mounted on the lever and adapted to engage the toothed rack 364 secured to the gear frame member 16. By this construction the hand lever 361 is held in its desired positions of adjustments and its primary function is to raise and lower the cutter bar by tilting or canting the harvester main frame and cutter bar platform on its pivotal axis 210 of the harvester gear frame. This is accomplished by rigidly securing to the hand lever 361 adjacent its pivotal connection with the gear frame, an arm 365 to which is pivotally connected a link 366 attached at its lower extremity to the inside shoe 352 of the cutter bar at or adjacent the same connection as the draw bar is attached to this shoe. If the relative lengths of the corresponding links and levers be properly arranged, it will be seen that when the operator shifts the hand lever 361 and so raises or lowers the inside shoe and cutter bar of the harvester main frame by tilting or canting the frame on the pivotal axis 210, the link 359 will be shifted by the lever accordingly, and this movement will be imparted through the pivoted arm 356 to shift the forward point of attachment 357 of the draw bar 350 with the harvester gear frame. By this construction, any relative change in the location of the inside shoe to the point of attachment of the drawbar to the tractor gear frame will be compensated by corresponding shifting of the point of attachment of the drawbar in the manner described, so that an operator may adjust the cutter bar freely in relation to the ground over which the machine is being moved, or may tilt the guards of the cutting apparatus to any desired angle without binding or interference with the mechanism for drawing the cutter bar from the tractor gear frame.

The manner of the operation of the machine will be apparent from the foregoing description, and it will be seen that our improved construction as herein shown and described, insures a combination of motor driven tractor and harvester mechanism that is efficient, and that this form of tractor device may be used freely over conditions of earth where even ordinary draft animals cannot successfully operate. It will also be seen that the machine is one that may be transported freely between any different points for use by a single operator without inconvenience or without the necessity of operating at the same time the harvester mechanism, and when the machine is in position, the driver may, without leaving the machine, or without leaving his seat, shift the cutting mechanism in proper relation with the ground, and throw the harvester mechanism into gear, operating the entire machine, and steering it from the driver's seat, to cut grain or grass, elevate it through and between the plies of the endless belt or track of the tractor mechanism, and deliver the cut material on the opposite side of the machine and in a continuous swath with the material arranged at right angles to the line of advance of the machine, if desired. It will be seen that the platform on the top of the gear frame provides a convenient means for the driver to move away from the seat to a position adjacent the engine for cranking it, and after the machine is once started, the operator may, by shifting the levers as described convenient to the driver's seat, connect the motor with the driving mechanism so that the endless track will be operated from the gear wheels 66 on the positively driven shaft 65, and the tractor and entire machine driven forwardly or in reverse direction according to the manner in which the connection is made through the power transmission devices. When the machine has reached the desired location for the operation of the harvester mechanism, this may be set in motion by the shifting of the two-part clutch members 239, 245 into engaging relation, when the entire harvester mechanism, including the cutter devices, the reel, the elevating and swathing devices, will be set in motion and operated as described.

In turning the machine, the operator from his seat by a manipulation of the ratchet lever 173, may wind the flexible cable on the capstan 170 and lift the forward end of the tractor gear frame off the ground a sufficient distance so that only a relatively small portion of the rear end of the endless track will be in engagement with the surface over which the machine is being driven, while the forward end of the machine will be entirely supported by the guiding wheels 32. With the tractor devices in this condition, the driver may freely operate the steering wheels from the hand steering wheel on the steering column 25 from its convenient position in front of the driver's seat.

Obviously other attachments than swathing devices may be applied to the delivery end of our harvester elevator mechanism when it is desired to use the machine for other purposes than swathing grass or grain, and in the present invention it is not desired to be limited in the application of the mechanism shown and described to a harvester which is only capable of depositing the harvested material in a continuous swath.

In order that the invention might be understood, the details of the preferred embodiment have been particularly described, but we desire to avail ourselves of a broad range of mechanical equivalents, and it will be apparent that persons skilled in this art may vary the structure with respect to details without departing from the purpose and spirit of our invention.

We claim:

1. The combination in a tractor harvester of a gear frame, a steering frame pivotally connected therewith, an endless belt traction device carried on the gear frame, a harvester main frame mounted in the gear frame and extending longitudinally at right angles to the forward line of advance of the gear frame, the said harvester frame comprising a cutter bar, and an elevator or transporting frame secured to the said cutter bar, the latter being interposed in the gear frame between the upper and lower runs of the said endless belt traction device on the gear frame and being adapted to discharge material harvested by the machine on the side of the gear frame opposite to that on which the cutter bar is arranged.

2. In a harvester tractor device, the combination of a gear frame, a steering frame pivotally connected with said gear frame, an endless belt traction device carried by the gear frame, sprockets on the gear frame supporting said endless belt traction device, harvester cutting mechanism carried by the said gear frame, a motor on the gear frame, operative connections between said motor and said traction device, independent means interposed between said motor and said harvester cutting mechanism for operating the latter, and means operated by the motor for delivering material from the cutting mechanism from the side of the endless belt traction device on which the cutting mechanism is located over and beyond one of the runs of the same to the opposite side thereof from the said cutter mechanism.

3. The combination in a tractor harvester, of a gear frame, an endless belt traction device on the gear frame, a motor on the gear frame for operating the said endless belt traction device, a steering frame pivotally connected with the gear frame, a motor on the gear frame, a harvester cutter bar secured to the gear frame, and extending at an angle from one side thereof, and means for conveying material from the harvester cutting mechanism between and beyond the runs of the endless belt traction device to a position on the opposite side of the latter from the side on which the harvester cutter bar is located.

4. In a harvester tractor, the combination with a gear frame, an endless belt tractor device on the gear frame, a steering frame, connections between the gear frame and the steering frame, a motor mounted on the gear frame, and a harvester main frame pivotally connected with the gear frame and being supported therein between the upper and lower runs of the endless belt traction device.

5. In a harvester tractor, the combination with a gear frame, of an endless belt traction device mounted on the gear frame and being adapted to support the same, a motor mounted on the gear frame, a main frame carrying harvester mechanism pivotally mounted in the gear frame and being interposed between the upper and lower runs of the endless belt traction device, means for operating the endless belt traction device from the motor, and independent means for operating the harvester mechanism from the motor.

6. In a harvester tractor, the combination of a gear frame, an endless belt traction device on the gear frame, and supporting the same, and being adapted to carry the gear frame over the ground, a steering frame pivotally connected with the gear frame, connections between a free end of the gear frame and the steering frame for lifting the said free end of the gear frame in relation to the steering frame, a motor on the gear frame, driving connections between the motor and the endless belt traction device of the gear frame, a harvester main frame pivotally mounted in the gear frame and being interposed between the upper and lower runs of the endless belt traction device, and means on the gear frame for controlling the pivotal movement of the harvester main frame in relation to the gear frame.

7. In a harvester tractor, the combination with a gear frame, an endless belt traction device connected therewith, a steering frame having pivotal connections with the gear frame, means for lifting the free end of the gear frame from the steering frame, a motor on the gear frame, connections between the motor and the endless belt traction devices, a harvester main frame mounted in the gear frame between the upper and lower runs of the endless belt traction devices, a harvester cutting device pivotally connected to the harvester main frame and extending therefrom at right angles to the direction of movement of said endless belt traction devices, and a swathing device secured to the said harvester main frame on the opposite side of the endless belt traction devices from the said harvester cutting device.

8. In a harvester tractor, the combination with a gear frame, a steering frame pivotally connected with the gear frame, means for lifting a free end of the gear frame in relation to the steering frame, an endless belt traction device on the gear frame, a harvester main frame pivotally connected with the gear frame and being interposed above one of the runs of the endless belt traction device, and being adapted to transport material cut by the harvester from one side of said endless belt traction device to the other side, cutting apparatus secured to the harvester main frame and protruding at approximately right angles to the line of advance of the endless belt traction devices on one side thereof, and a swathing device connected with the harvester main frame and extending free of the said endless belt traction devices on the side thereof opposite the said cutting apparatus.

9. In a harvester tractor, the combination with a gear frame, of an endless belt traction device connected therewith, a steering frame having a pivotal connection with a gear frame, means for lifting the free end of the gear frame from the steering frame, a motor on the gear frame, driving connections between the motor and the endless belt traction devices, a harvester main frame mounted in the gear frame and overlying and extending across one of the runs of the endless belt traction devices, a harvester cutting device connected to the harvester main frame and extending therefrom at right angles to the direction of movement of said endless belt traction devices, and a swathing device pivotally connected to the said harvester main frame and extending laterally therefrom on the opposite side of the endless belt traction devices from the said harvester cutting device.

10. In a harvester tractor, the combination with a gear frame, of an endless belt traction device connected therewith, a steering frame having a pivotal connection with the gear frame, means for lifting the free end of the gear frame from the steering frame, a motor on the gear frame, driving connections between the motor and the endless belt traction devices, a harvester main frame mounted in the gear frame and overlying and extending across one of the runs of the endless belt traction devices, a harvester cutting device connecting to the harvester main frame and extending therefrom at right angles to the direction of movement of said endless belt traction devices, and a swathing device pivotally connected to the said harvester main frame and extending laterally therefrom on the opposite side of the endless belt traction devices from the said harvester cutting device.

11. In a harvester tractor, the combination with a gear frame, of an endless belt traction device connected therewith, a steering frame having a pivotal connection with a gear frame, means for lifting the free end of the gear frame from the steering frame, a motor on the gear frame, driving connections between the motor and the endless belt traction devices, a harvester main frame mounted in the gear frame and overlying and extending across one of the runs of the endless belt traction devices, a harvester cutting device connected to the harvester main frame and extending therefrom at right angles to the direction of movement of said endless belt traction devices, and a swathing device pivotally secured to the said harvester main frame on the opposite side of the endless belt traction devices from the said harvester cutting device.

12. In a harvester tractor, the combination with a gear, of an endless belt traction device connected therewith, a steering frame having pivotal connection with the gear frame, means for lifting the free end of the gear frame from the steering frame, a motor on the gear frame, connections between the motor and the endless belt traction devices for operating the latter, a harvester main frame pivotally connected to the gear frame, the axis of the pivotal connection between the main frame and the gear frame being approximately at right angles to the line of advance of the machine and the harvester main frame being secured to the gear frame so that it overlies one of the runs of the endless belt traction devices, a harvester cutting device comprising a platform secured to the harvester main frame and extending therefrom at right angles to the direction of movement of said endless belt traction devices, harvester transporting and delivering devices on the harvester main frame, means for operating the last said devices from the motor on the gear frame, reel mechanism supported by the harvester cutting devices and adjacent to the cutter thereon, means for operating the reel mechanism from the harvester transporting and delivering devices, a cutter in the harvester cutting platform, means for operating the cutter from the moving devices on the harvester main frame, and means interposed between the tractor gear frame and the harvester frame for controlling the pivotal movement of the harvester main frame and cutting devices in relation to the tractor gear frame for controlling the height of the cutting devices.

13. In a harvester tractor, the combination with a gear frame, of an endless belt traction device on said frame, a steering frame having pivotal connections with the gear frame, means for lifting the free end of the gear frame from the steering frame, a motor on the gear frame, driving connections between the motor and the endless belt traction device, a harvester main frame pivotally mounted in the gear frame between the upper and lower runs of the endless belt traction device, a harvester cutter platform connected to the harvester main frame and extending therefrom at right angles to the direction of movement of said endless belt traction devices, a swathing device secured to said harvester main frame and extending therefrom on the side of the endless belt traction device opposite the said harvester cutting devices, reel mechanism supported on the said harvester cutting device, transporting mechanism carried on the harvester main frame, means on the swathing device for discharging cut material therefrom, means for operating the moving devices on the said harvester main frame and on the swathing device from the motor on the gear frame, operative connections between the harvester main frame and the cutting and reeling devices on the cutter platform, and adjustable means for controlling the relation of the harvester main frame to the tractor gear frame.

14. In a harvester tractor, the combination with a gear frame, of an endless belt traction device on the gear frame, a steering frame, connections between the steering frame and the gear frame for controlling the gear frame, a motor mounted on the gear frame, a harvester main frame pivotally connected with the gear frame and adapted to extend laterally from one side of the gear frame to the other over one of the runs of the endless belt traction device, and means for controlling the relation of the harvester main frame to the gear frame on its pivotal connection therewith.

15. In a harvester tractor, the combination with a gear frame, of an endless belt traction device on the gear frame, a steering frame, connections between the gear frame and steering frame for controlling the latter, a motor mounted on the gear frame, a harvester main frame pivotally connected with the gear frame and being supported therein between the lower and upper runs of the endless belt traction device, there being harvester devices on the harvester main frame, means for operating the endless belt traction device and the harvester devices from the motor on the gear frame, and means for controlling the relation of the harvester main frame with respect to the gear frame on its pivotal connection with the latter for the purpose of varying the height of the harvester main frame in relation to the surface over which the harvester tractor is being operated.

16. In a harvester tractor, the combination with a gear frame, of an endless belt traction device on the gear frame, a steering frame, connections between the gear frame and the steering frame for controlling the gear frame from the latter, a motor mounted on the gear frame, a harvester main frame pivotally connected with the gear frame on an axis approximately at right angles to the line of advance of the harvester tractor and being supported in the gear frame between the upper and lower runs of the endless belt traction device, there being a harvester cutter platform secured to the harvester main frame and projecting laterally therefrom on one side of the endless belt traction devices, means for maintaining the alinement of the harvester cutter platform in relation to the tractor gear frame and for controlling the tilting of the harvester cutter platform and main frame in relation to the gear frame comprising a draw bar pivotally connected to the harvester cutter platform at one end and being connected at its other extremity to one end of a compensating lever which is pivotally secured to a fixed part of the gear frame, an adjusting lever and suitable connections therebetween and the harvester cutter platform for tilting the latter on the pivotal axis of the main frame with the tractor gear frame, and an operative connection between the said adjusting lever and the compensating lever to which the draw bar is secured for shifting the point of attachment of the draw bar in relation to the tractor gear frame as the harvester cutter platform is rocked on the pivotal axis of the main frame with the gear frame to vary the height of the cutting devices on the harvester cutter platform.

17. In a harvester tractor, the combination with a gear frame, of an endless belt traction device mounted on the gear frame and being adapted to support the same, a motor mounted on the gear frame, a harvester main frame pivotally mounted in the gear frame and being superposed above one of the runs of the endless belt traction device, and carrying harvester mechanism, means for operating the endless belt traction device from the motor, independent means for operating the harvester mechanism from the motor, a cutter bar pivotally secured to the harvester main frame on an axis at approximately right angles to the pivotal connection of the harvester main frame with the gear frame, a draw bar secured to the harvester cutter bar adjacent its pivotal connection with the main frame, one end of the said bar being secured to the tractor gear frame for maintaining the harvester cutter bar in correct alinement with the gear frame, means for tilting the harvester cutter bar on the pivotal connection of the main frame with the gear frame, and compensating means operatively connected with the said tilting means for varying the point of attachment of the said cutter bar draft device with the gear frame during the tilting movement of the harvester main frame on its pivotal connection with the gear frame.

18. In a harvester tractor, the combination with a steering frame, of a gear frame pivotally connected with the steering frame, means for controlling the gear frame from the steering frame, an endless belt traction device mounted on the gear frame and being adapted to support the same, a motor mounted on the gear frame, a harvester main frame pivotally mounted in the gear frame and being arranged to extend laterally through the gear frame and above one of the runs of the endless belt traction device, a pivotal connection between the harvester main frame and the gear frame, said pivotal connection being on an axis at approximately right angles to the line of forward advance of the machine, there being a cutter bar platform pivotally secured to the harvester main frame on an axis approximately at right angles to the pivotal connection between the harvester main frame and the tractor gear frame, together with a harvester elevator frame pivotally secured to the cutter bar platform with its receiving end adjacent the point of securement of the elevator frame to the cutter bar platform, and means for supporting the free end of the harvester elevator frame from the harvester main frame whereby a sliding connection is secured between the said elevator frame and the harvester main frame.

19. The combination with a tractor gear frame, of an endless belt traction device carried thereby, a harvester main frame secured to the tractor gear frame, there being harvester cutting devices secured to the harvester main frame and extending laterally therefrom and approximately at right angles to the line of advance of the said tractor gear frame and on one side thereof, together with a swathing attachment secured to the said harvester main frame and extending laterally therefrom on the side of the tractor gear frame opposite to that on which the harvester cutting device extends, pivotal connections between the harvester main frame and the tractor gear frame, and means for controlling the harvester main frame in relation to the tractor gear frame, said means being operable by a driver from a position on the harvester tractor device.

20. In a harvester tractor, the combination with a tractor gear frame, of an endless track mounted on the gear frame and being adapted to support and carry the gear frame over the ground, supporting and driving sprockets rotatably mounted on said gear frame and operatively connected with said track, a harvester main frame carried by said gear frame, a motor on the gear frame, means for operating one of said endless track sprockets from the motor, independent means for operating said harvester mechanism from said motor, cutting mechanism secured to the harvester main frame and extending therefrom laterally of the forward line of advance of the endless belt traction device, means for discharging cut material from the machine secured to the harvester main frame on the side thereof opposite the side to which the said cutting devices are secured, and means operable by the harvester operating means and independent of the tractor device for delivering cut material from the cutting mechanism over and beyond one of the runs of the endless track.

21. In a harvester tractor, the combination with a tractor gear frame, of an endless track mounted on the gear frame and being adapted to support and carry the gear frame over the ground, supporting and driving sprockets rotatably mounted on said gear frame and operatively connected with said track, a harvester main frame carried by said gear frame, cutting and discharging mechanism carried by said harvester main frame, a motor on the rear frame, means for operating one of said endless track sprockets from the motor, independent means for operating said harvester mechanism from the motor, cutting mechanism secured to the harvester main frame and extending therefrom laterally of the forward line of advance of the endless belt traction device, means for discharging cut material from the machine secured to the harvester main frame on the side thereof opposite the side to which the said cutting devices are secured, and means for delivering material from the cutting mechanism between and beyond the upper and lower runs of the endless track.

22. The combination in a tractor harvester, of a gear frame, an endless belt traction device on the gear frame, a motor for operating the said endless belt traction device, a steering frame pivotally connected with the gear frame, a harvester cutter bar secured to the gear frame and extending at an angle from one side thereof adjacent the endless belt traction device, and means for conveying material from the harvester cutting mechanism over and beyond one of the runs of the endless belt traction device to a position on the opposite side of the latter from the side on which the harvester cutter bar is located.

In testimony whereof we have signed our names to this specification, in the presence of two subscribing witnesses, on this 24th day of May A. D. 1916.

STANLEY G. MILLER.
DORCY OLEN DE WITT.

Witnesses:
OLIVE B. ROULEAU,
STANLEY F. MILLER.

Copies of this patent may be obtained for five cents each, by addressing the "Commissioner of Patents, Washington, D. C."